(12) United States Patent
Liu et al.

(10) Patent No.: US 12,061,372 B2
(45) Date of Patent: Aug. 13, 2024

(54) LENS DRIVING MODULE

(71) Applicant: TDK TAIWAN CORP., Taoyuan (TW)

(72) Inventors: Shou-Jen Liu, Taoyuan (TW);
Chia-Hsiu Liu, Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 432 days.

(21) Appl. No.: 16/920,068

(22) Filed: Jul. 2, 2020

(65) Prior Publication Data

US 2020/0333553 A1  Oct. 22, 2020

Related U.S. Application Data

(63) Continuation of application No. 15/913,662, filed on Mar. 6, 2018, now Pat. No. 10,739,549.

(30) Foreign Application Priority Data

Mar. 30, 2017 (CN) .......................... 201720327434.1

(51) Int. Cl.
*G02B 7/04* (2021.01)
*G02B 7/02* (2021.01)
*G02B 7/08* (2021.01)

(52) U.S. Cl.
CPC .............. *G02B 7/04* (2013.01); *G02B 7/021* (2013.01); *G02B 7/08* (2013.01)

(58) Field of Classification Search
CPC . G02B 7/09; G02B 7/08; G03B 13/36; G03B 2205/0007; G03B 2205/0069; H02K 41/0356

USPC .......................... 359/811, 819, 822, 823, 824
See application file for complete search history.

(56) References Cited

U.S. PATENT DOCUMENTS

| | | | |
|---|---|---|---|
| 8,558,419 B2 * | 10/2013 | Lee | H02K 41/0356 310/12.16 |
| 8,849,106 B1 * | 9/2014 | Kokichi | H04N 5/2328 396/55 |
| 10,425,563 B2 | 9/2019 | Park | |
| 10,444,465 B2 | 10/2019 | Yan | |
| 2013/0010378 A1 | 1/2013 | Wang | |

FOREIGN PATENT DOCUMENTS

WO   WO-2017043884 A1 *  3/2017  ........... G02B 27/646

* cited by examiner

*Primary Examiner* — William Choi
(74) *Attorney, Agent, or Firm* — MUNCY, GEISSLER, OLDS & LOWE, PC

(57) ABSTRACT

A lens driving module for holding and moving a lens is provided, including a lens holder, a first electromagnetic driving assembly disposed on the lens holder, a base, a second electromagnetic driving assembly disposed on the base, and a first elastic member. The lens holder has an accommodating space, and the lens is disposed in the accommodating space. The second electromagnetic driving assembly is adjacent to the first electromagnetic driving assembly. The first elastic member has at least one first fixed portion and at least one moving portion. The first fixed portion is connected to the base, and the first moving portion is connected to the lens holder. The first fixed portion is disposed between the second electromagnetic driving assembly and the base.

3 Claims, 8 Drawing Sheets

LENS DRIVING MODULE

CROSS REFERENCE TO RELATED APPLICATIONS

[0001] This application is a Continuation of application Ser. No. 15/913,662, filed on Mar. 6, 2018, which claims the benefit of China Patent Application No. 201720327434.1, filed on Mar. 30, 2017.

BACKGROUND OF THE INVENTION

Field of the Invention

The application relates in general to a lens driving module, and in particular, to a lens driving module which used to hold and move a lens.

Description of the Related Art

As technology has advanced, a lot of electronic devices (for example, cameras and smartphones) have incorporated the functionality of taking photographs and recording video. These electronic devices have become more commonplace, and have been developed to be more convenient and thin. More and more options are provided for users to choose from.

Electronic devices are becoming thinner than before, and this makes it harder to dispose current models of zoom lenses into these miniaturized electronic devices. Therefore, how to address the aforementioned problem has become an important issue.

BRIEF SUMMARY OF INVENTION

To address the deficiencies of conventional products, an embodiment of the invention provides a lens driving module for holding and moving a lens, including a lens holder, a first electromagnetic driving assembly disposed on the lens holder, a base, a second electromagnetic driving assembly disposed on the base, and a first elastic member. The lens holder has an accommodating space, and the lens is disposed in the accommodating space. The second electromagnetic driving assembly is adjacent to the first electromagnetic driving assembly. The first elastic member has at least one first fixed portion and at least one moving portion. The first fixed portion is connected to the base, and the first moving portion is connected to the lens holder. The first fixed portion is disposed between the second electromagnetic driving assembly and the base.

In some embodiments, the lens driving module has a first side and a second side connected to the first side, and the second side is larger than the first side.

In some embodiments, the lens driving module substantially has a cuboid structure.

In some embodiments, the second electromagnetic driving assembly is adjacent to the first side.

In some embodiments, the first fixed portion is adjacent to the first side.

In some embodiments, the first moving portion is adjacent to the second side.

In some embodiments, the first elastic member further comprises a first string portion connected to the first fixed portion and the first moving portion.

In some embodiments, the first elastic member comprises a plurality of first elastic parts separated from each other, wherein each of the first elastic parts comprises one first fixed portion and two first moving portions, and the first fixed portion is disposed between the first moving portions.

In some embodiments, the first elastic member comprises a plurality of first elastic parts separated from each other, wherein each of the first elastic parts comprises one first fixed portion and one first moving portion, and the first fixed portion and the first moving portion are disposed on opposite ends of each of the first elastic parts.

In some embodiments, the first elastic member comprises a plurality of first elastic parts separated from each other, wherein each of the first elastic parts comprises two first fixed portions and one first moving portion, and the first moving portion is disposed between the first fixed portions.

In some embodiments, the lens driving module further comprises a top plate and a second elastic member, the top plate is affixed relative to the base, and the second elastic member is disposed between the top plate and the lens holder and connected to the top plate and the lens holder, wherein the lens holder is disposed between the first elastic member and the second elastic member.

In some embodiments, the second elastic member comprises at least one second fixed portion and at least one second moving portion, the second moving fixed portion is connected to the top plate, and the second moving portion is connected to the lens holder, wherein the second fixed portion is disposed between the second electromagnetic driving assembly and the top plate.

In some embodiments, the lens driving module has a first side and a second side connected to the first side, and the second side is larger than the first side, wherein the second fixed portion is adjacent to the first side.

In some embodiments, the lens driving module has a first side and a second side connected to the first side, and the second side is larger than the first side, wherein the second moving portion is adjacent to the second side.

In some embodiments, the second elastic member further comprises at least one string portion connected to the second fixed portion and the second moving portion.

In some embodiments, the second elastic member comprises a plurality of second elastic parts separated from each other, wherein each of the second elastic parts comprises one second fixed portion and two second moving portions, and the second fixed portion is disposed between the second moving portions.

In some embodiments, the second elastic member comprises a plurality of second elastic parts separated from each other, wherein each of the second elastic parts comprises one second fixed portion and one second moving portion, and the second fixed portion and the second moving portion are disposed on opposite ends of each of the second elastic parts.

In some embodiments, the second elastic member comprises a plurality of second elastic parts separated from each other, wherein each of the second elastic parts comprises two second fixed portions and one second moving portion, and the second moving portion is disposed between the second fixed portions.

In some embodiments, the second elastic member comprises two second fixed portion and one second moving portion, wherein the second moving portion has an annular structure and is disposed between the second fixed portions.

In some embodiments, the lens driving module has two first sides on opposite sides and two second sides on opposite sides, and each of the second sides is greater than each of the first sides, wherein the second fixed portions are respectively adjacent to the first sides.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the lens driving module are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
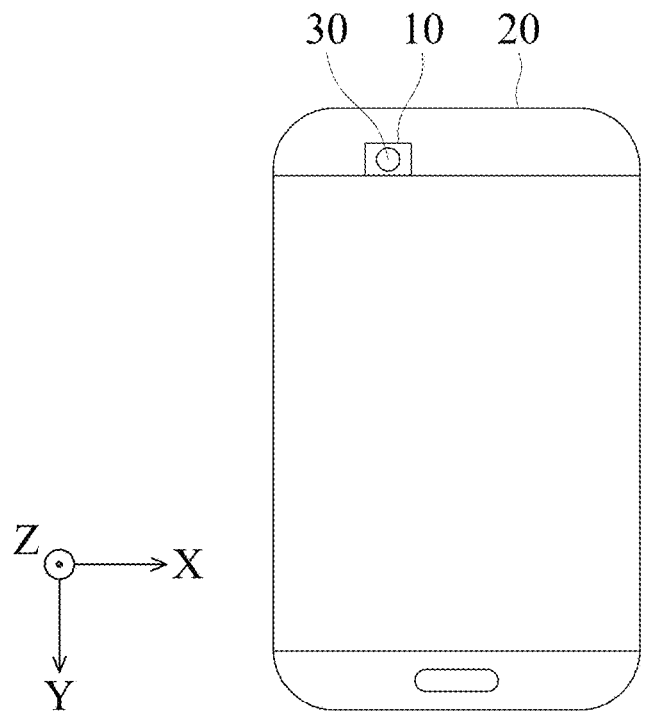
FIG. 1 is a schematic diagram of an electronic device according to an embodiment of the invention.

Referring to FIG. 1, in an embodiment of the invention, the lens driving module 10 can be disposed in an electronic device 20 and used to hold and drive a lens 30, so that the lens 30 can move relative to an image sensor in the electronic device 20, and the purpose of focus adjustment can be achieved. For example, the electronic device 20 can be a digital camera or a smart phone having the function of capturing photographs or making video recordings.

Figure 2:
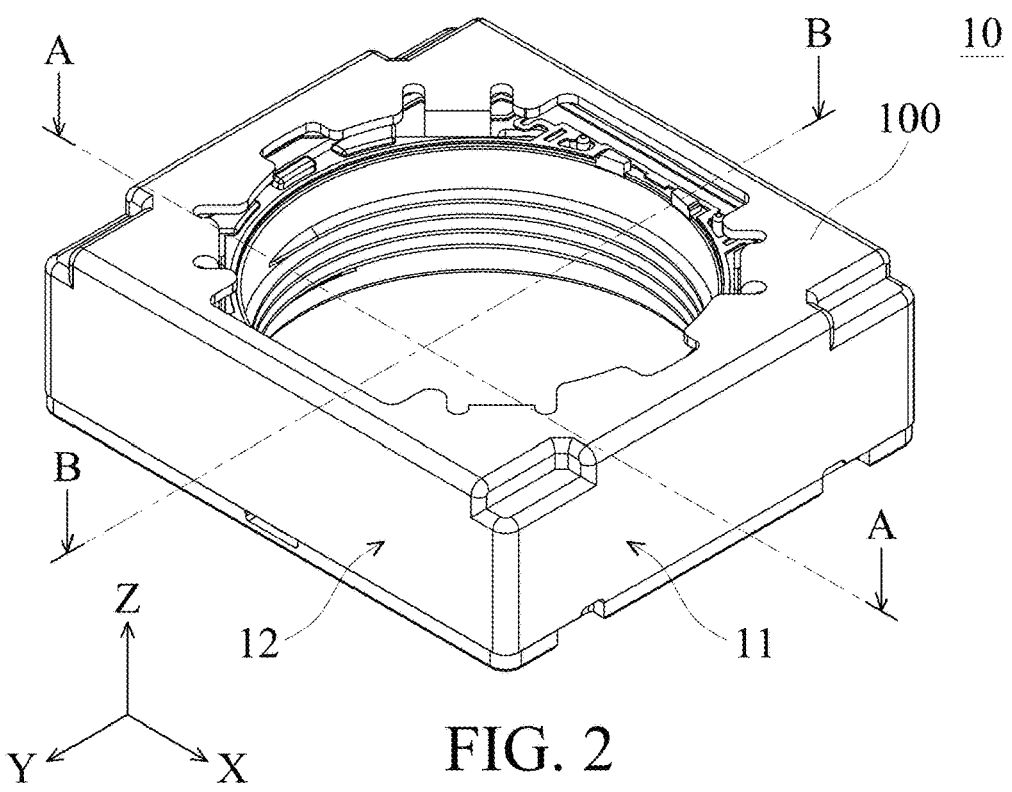
FIG. 2 is a schematic diagram of a lens driving module according to an embodiment of the invention.
Figure 3:
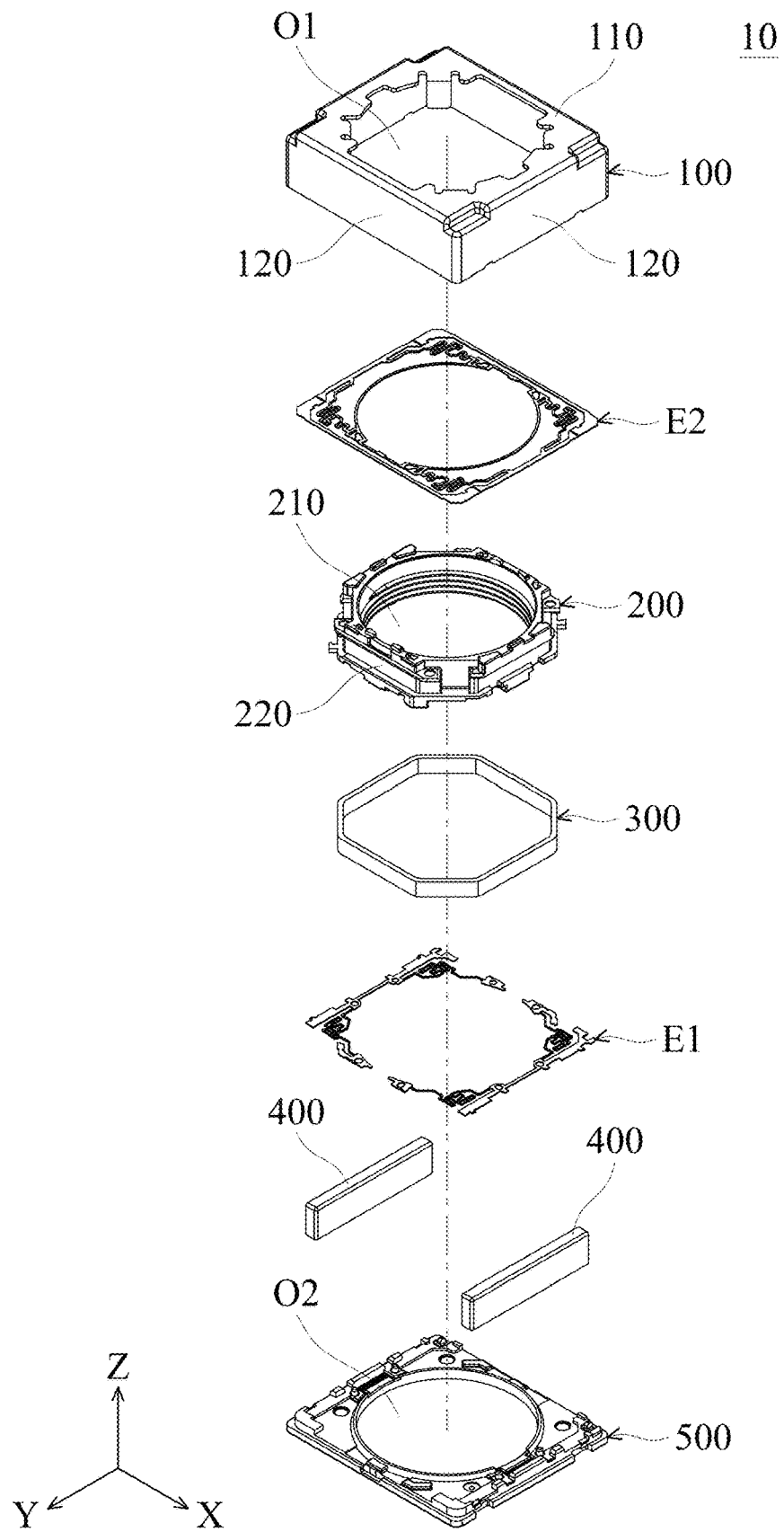
FIG. 3 is an exploded-view diagram of a lens driving module according to an embodiment of the invention.

FIG. 2 is a schematic diagram of the lens driving module 10, and FIG. 3 is an exploded-view diagram thereof. As shown in FIGS. 2 and 3, the lens driving module 10 primarily comprises an upper housing 100, a lens holder 200, at least one first electromagnetic driving assembly 300, at least one second electromagnetic driving assembly 400, a base 500, a first elastic member E1, and a second elastic member E2. The upper housing 100 comprises a top plate 110 and four lateral walls 120 connected to the top plate 110, such that the upper housing 100 and the base 500 can be assembled and form a hollow box. The lens holder 200, the first electromagnetic driving assembly 300, the second electromagnetic driving assembly 400, the first elastic member E1, and the second elastic member E2 can be disposed in the hollow box.

The lens driving module 10 substantially has a cuboid structure. The length of a first side 11 of the lens driving module 10 is less than that of a second side 12 of the lens driving module 10.

The lens holder 200 has an accommodating space 210 and a concave structure 220, wherein the accommodating space 210 is formed at the center of the lens holder 200, and the concave structure 220 is formed on the outer wall of the lens holder 200 and surrounds the accommodating space 210. The lens 30 shown in FIG. 1 can be affixed to the lens holder 200 and accommodated in the accommodating space 210. The upper housing 100 and the base 500 respectively have an opening O1 and an opening O2, and both the openings O1 and O2 correspond to the accommodating space 210. The image sensor (not shown) in the electronic device 20 is usually disposed under the base 500 and affixed relative to the base 500. Therefore, external light can reach the image sensor through the opening O1, the lens 30, and the opening O2 in sequence, so as to form an image on the image sensor.

The first electromagnetic driving assembly 300 is disposed in the concave structure 220 of the lens holder 200, and the second electromagnetic driving assembly 400 is disposed on the base 500 and adjacent to the first electromagnetic driving assembly 300. The lens holder 200 can be driven to move relative to the base 500 along the Z-axis by the electromagnetic effect between the first electromagnetic driving assembly 300 and the second electromagnetic driving assembly 400.

For example, in this embodiment, the first electromagnetic driving assembly 300 is a driving coil surrounding the accommodating space 210 of the lens holder 200, and the second electromagnetic driving assembly 400 comprises two magnets, wherein the driving coil is disposed between two magnets.

When a current flows through the driving coil (the first electromagnetic driving assembly 300), the electromagnetic effect is generated between the driving coil and the magnets. Thus, the lens holder 200 and the lens 30 disposed thereon can be driven to move upwardly or downwardly relative to the base 500 and the image sensor along the Z-axis, and the purpose of focus adjustment can be achieved.

In some embodiments, the first electromagnetic driving assembly 300 can be a magnet, and the second electromagnetic driving assembly 400 can be a driving coil.

Figure 4:
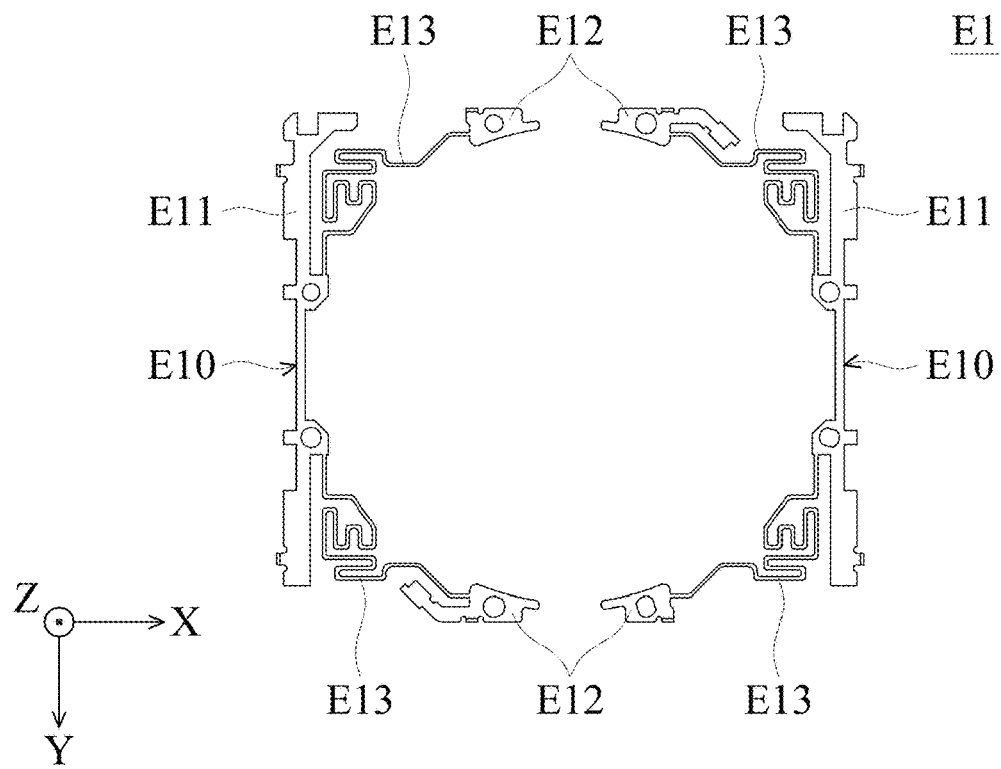
FIG. 4 is a schematic diagram of a first elastic member according to an embodiment of the invention.

Referring to FIGS. 3 and 4, in this embodiment, the first elastic member E1 comprises a plurality of first elastic parts E10. Each of the first elastic parts E10 comprises one first fixed portion E11, two first moving portions E12, and a plurality of first string portions E13 connected to the first fixed portion E11 and the first moving portions E12.

Two first moving portions E12 are respectively disposed on opposite ends of the first elastic part E10, and the first fixed portion E11 is disposed between two first moving portions E12. The first fixed portion E11 is affixed to the base 500 by sticking or using a locking member (for example, by using a screw), and the first moving portions E12 are affixed to the lens holder 200 by sticking or using a locking member (for example, by using a screw).

The surface area of the first fixed portion E11 and the first moving portion E12 is greater than that of the first string portion E13, therefore, the sticking area of the first fixed portion E11 and the first moving portion E12 can be increased, or more locking members can be disposed. The loosen of the first fixed portion E11 and the first moving portion E12 due to the movement of the lens holder 200 relative to the base 500 can be avoided.

Figure 5:
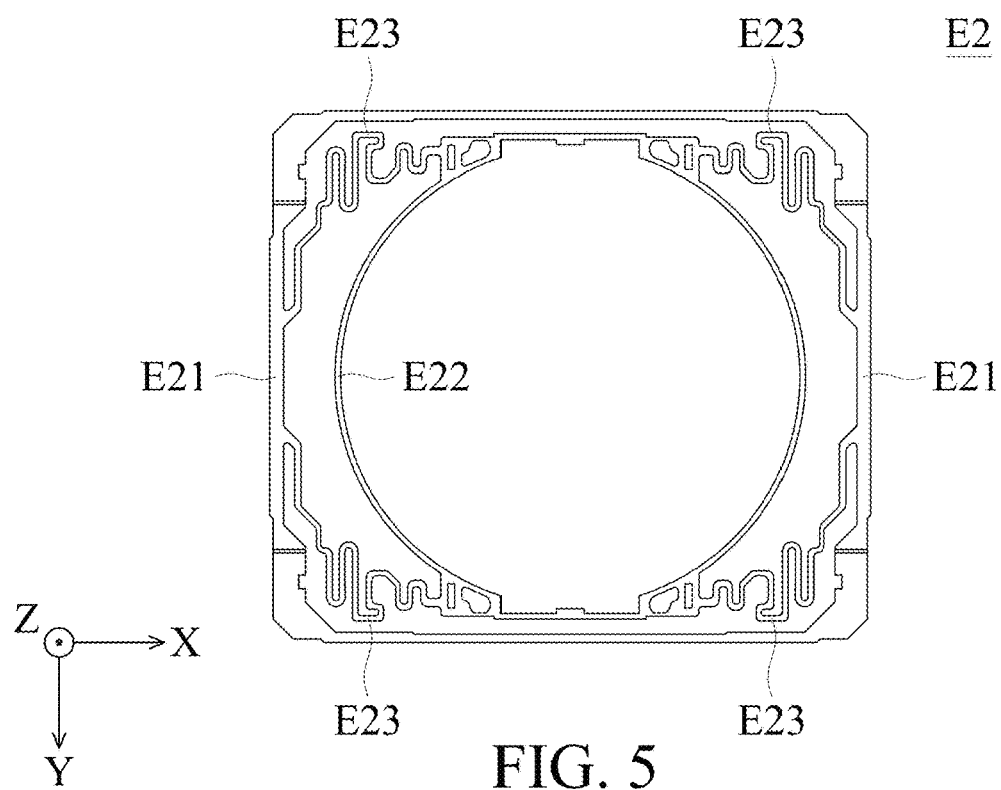
FIG. 5 is a schematic diagram of a second elastic member according to an embodiment of the invention.

As shown in FIGS. 3 and 5, in this embodiment, the second elastic member E2 comprises two second fixed portions E21, one second moving portion E22, and a plurality of second string portions E23 connected to the second fixed portions E21 and the second moving portion E22. The second moving portion E22 has an annular structure and disposed between two second fixed portions E21.

Similar to the first elastic member E1, the second fixed portions E21 of the second elastic member E2 are affixed to the top plate 110 of the upper housing 100 by sticking or using a locking member (for example, by using a screw), and the second moving portion E22 is affixed to the lens holder 200 by sticking.

As shown in FIG. 3, the lens holder 200 is disposed between the first elastic member E1 and the second elastic member E2, and can be hung in the box formed by the upper housing 100 and the base 500 by the first elastic member E1 and the second elastic member E2. Moreover, when the lens holder 200 moves relative to the base 500, the first elastic member E1 and the second elastic member E2 are deformed and provides elastic force, and the range of motion of the lens holder 200 in the direction of the Z-axis can be restricted.

Figure 6:
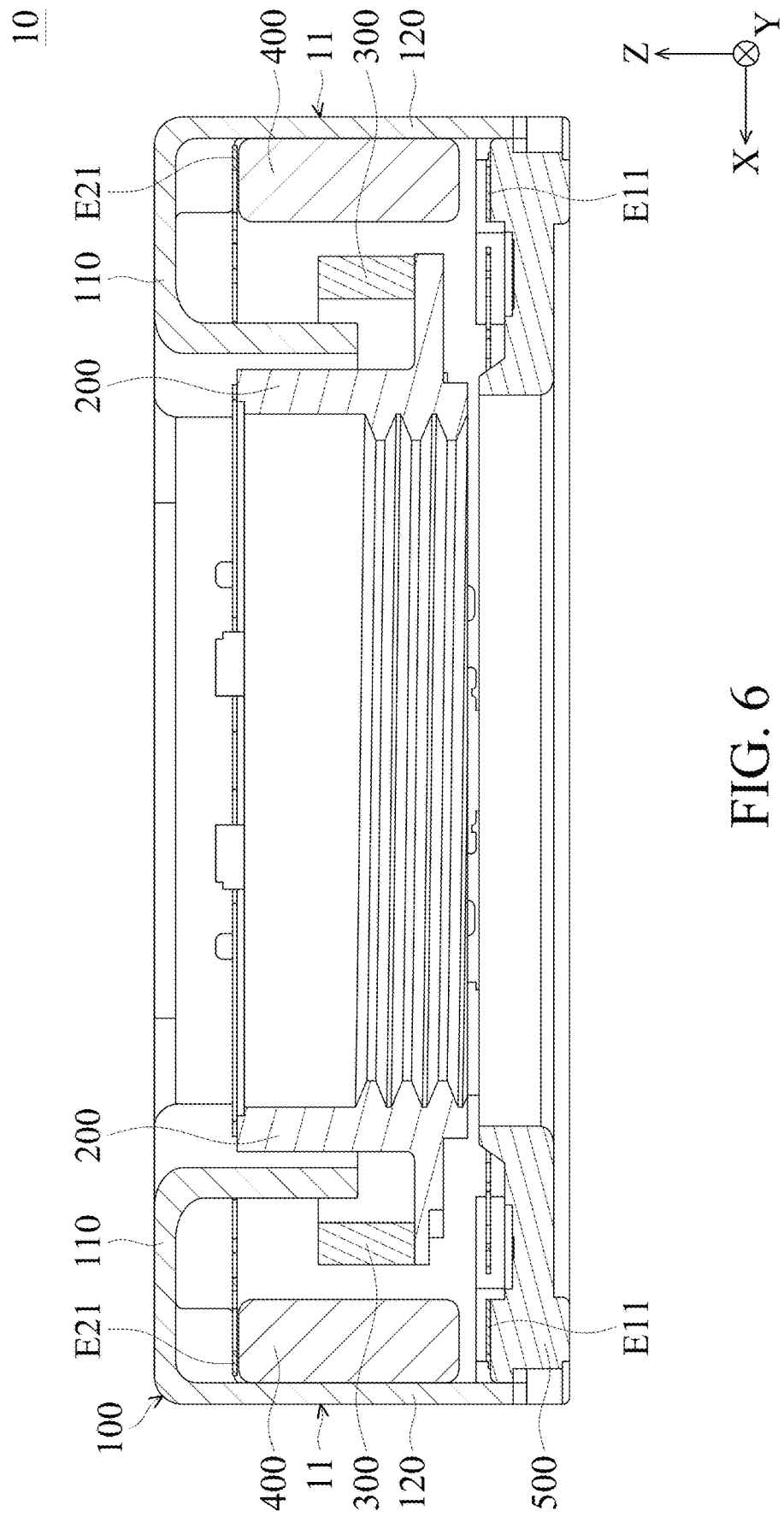
FIG. 6 is a cross-sectional view along line A-A in FIG. 2.

FIG. 6 is a cross-sectional view of the lens driving module 10 shown in FIG. 2 along line A-A. As shown in FIG. 6, when the first fixed portion E11 of the first elastic member E1 and the second electromagnetic driving assembly 400 are affixed to the base 500, the first fixed portion E11 and the second electromagnetic driving assembly 400 are adjacent to the first side 11 of the lens driving module 10, and the first fixed portion E11 is disposed between the second electromagnetic driving assembly 400 and the base 500. Similarly, when the second fixed portions E21 of the second elastic member E2 are affixed to the top plate 110 of the upper housing 100, two second fixed portions E21 are respectively adjacent to the opposite first sides 11 of the lens driving module 10, and disposed between the second electromagnetic driving assembly 400 and the top plate 110.

Therefore, the whole volume of the lens driving module 10 can be reduced, such that the lens driving module 10 can be disposed in the miniaturized electronic device 20.

Figure 7:
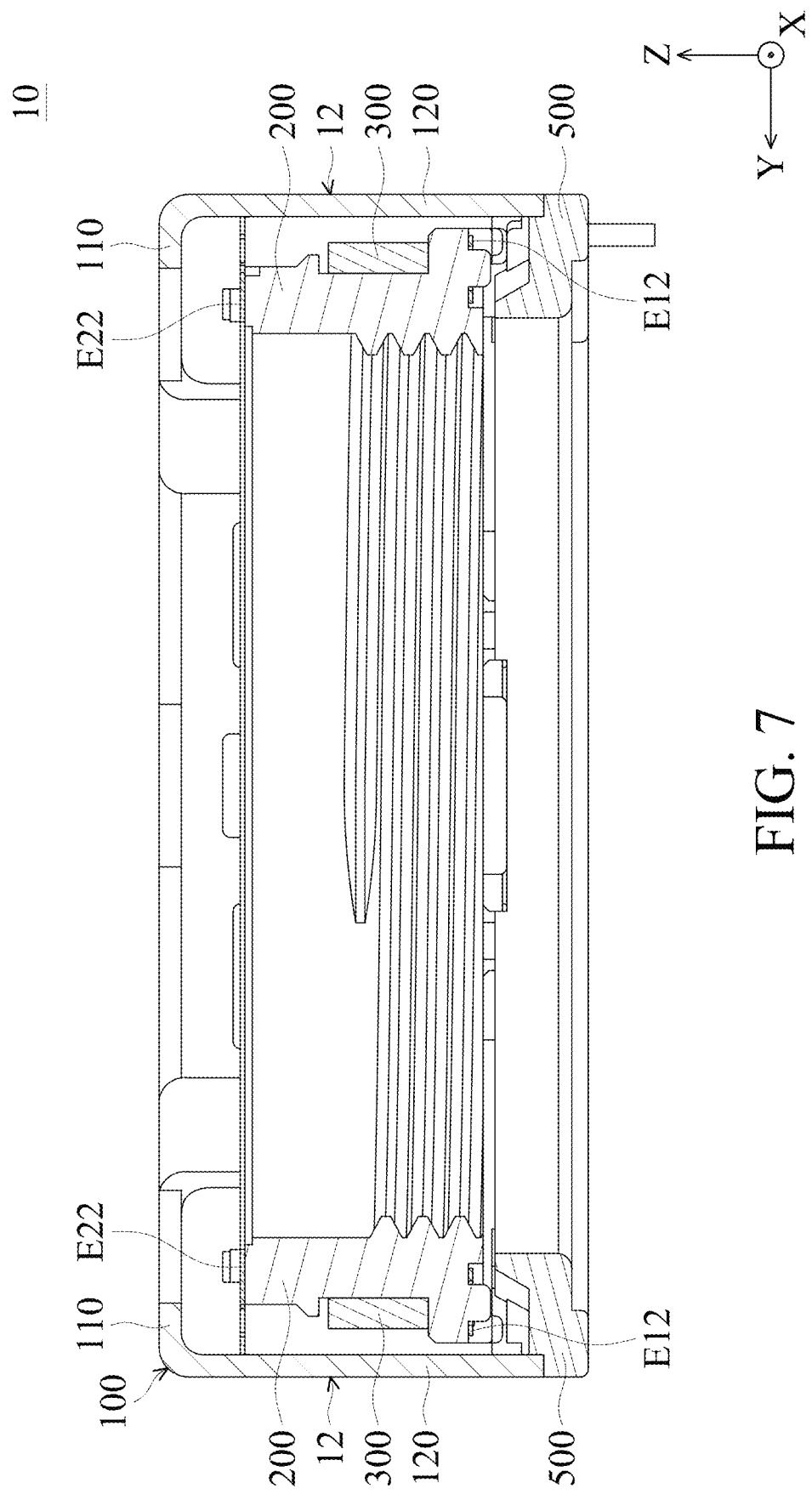
FIG. 7 is a cross-sectional view along line B-B in FIG. 2.

FIG. 7 is a cross-sectional view of the lens driving module 10 shown in FIG. 2 along line B-B. As shown in FIG. 7, when the first moving portion E12 of the first elastic member E1 is affixed to the lens holder 200, the first moving portion E12 is adjacent to the second side 12 of the lens driving module 10.

Since the first moving portion E12 and the first string portion E13 connected to the first fixed portion E12 and the first moving portion E12 are not covered by the second electromagnetic driving assembly 400 in the direction of the Z-axis, the second elastic member E2 does not contact the second electromagnetic driving assembly 400 when the lens holder 200 moves upwardly along the Z-axis, and the movement of the lens holder 200 is not disturbed.

Figure 8A:
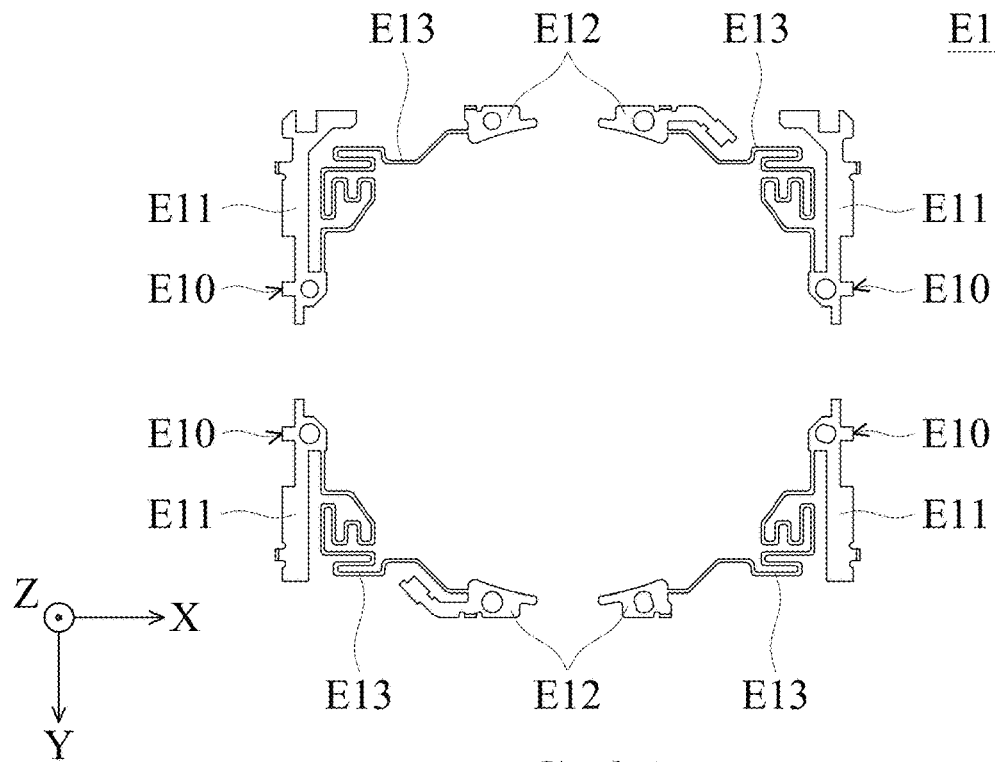
FIG. 8A is a schematic diagram of a first elastic member according to another embodiment of the invention.

The appearance and the structure of the first elastic member E1 of the lens driving module 10 can be adjusted as required. For example, as shown in FIG. 8A, in another embodiment, the first elastic member E1 comprises a plurality of first elastic parts E10, and each of the first elastic parts E10 comprises one first fixed portion E11, one first moving portion E12, and a plurality of first string portions E13 connected to the first fixed portion E11 and the first moving portion E12. The first fixed portion E11 and the first moving portion E12 are respectively disposed on opposite ends of the first elastic part E10.

Figure 8B:
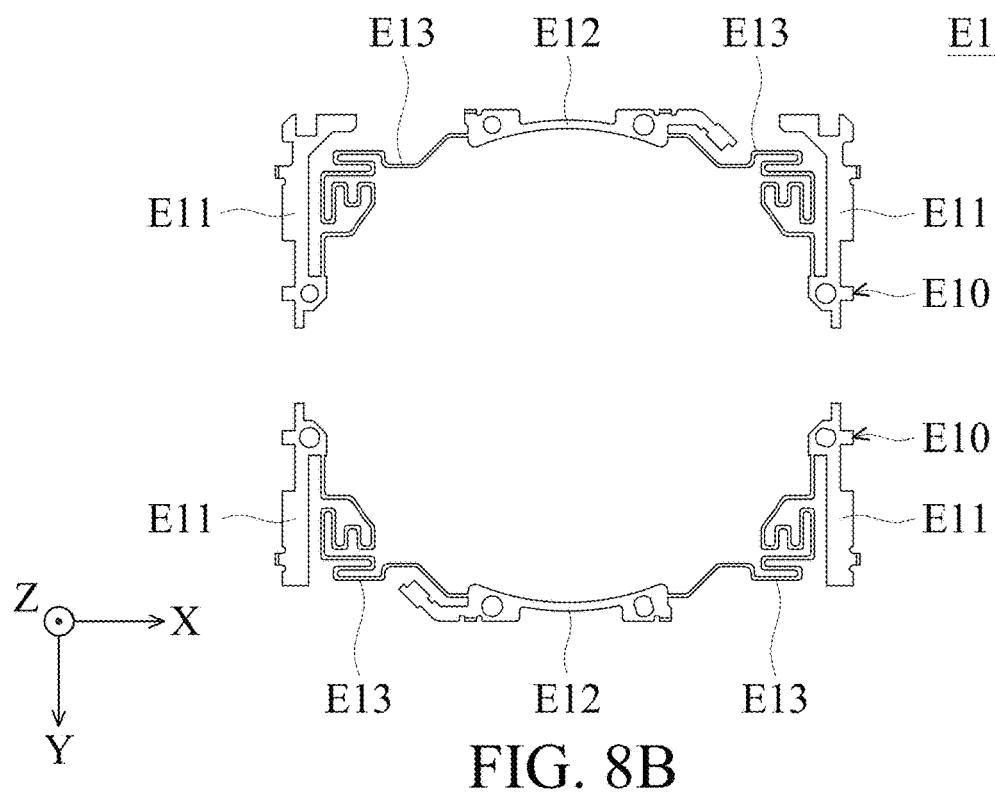
FIG. 8B is a schematic diagram of a first elastic member according to another embodiment of the invention.

As shown in FIG. 8B, in another embodiment, the first elastic member E1 comprises a plurality of first elastic parts E10, and each of the first elastic parts E10 comprises two first fixed portions E11, one first moving portion E12, and a plurality of first string portions E13 connected to the first fixed portions E11 and the first moving portion E12. Two first fixed portions E11 are respectively disposed on opposite ends of the first elastic part E10, and the first moving portion E12 is disposed between two first fixed portions E11.

It should be noted that, when the first elastic member E1 in FIG. 8A or FIG. 8B is used in the lens driving module 10, the first fixed portion E11 and the first moving portion E12 are also adjacent to the first side 11 and the second side 12 of the lens driving module 10 respectively, and the first fixed portion E11 is also disposed between the second electromagnetic driving assembly 400 and the base 500. Therefore, the lens driving module 10 can be reduced and the movement of the lens holder 200 is not disturbed.

Figure 9A:
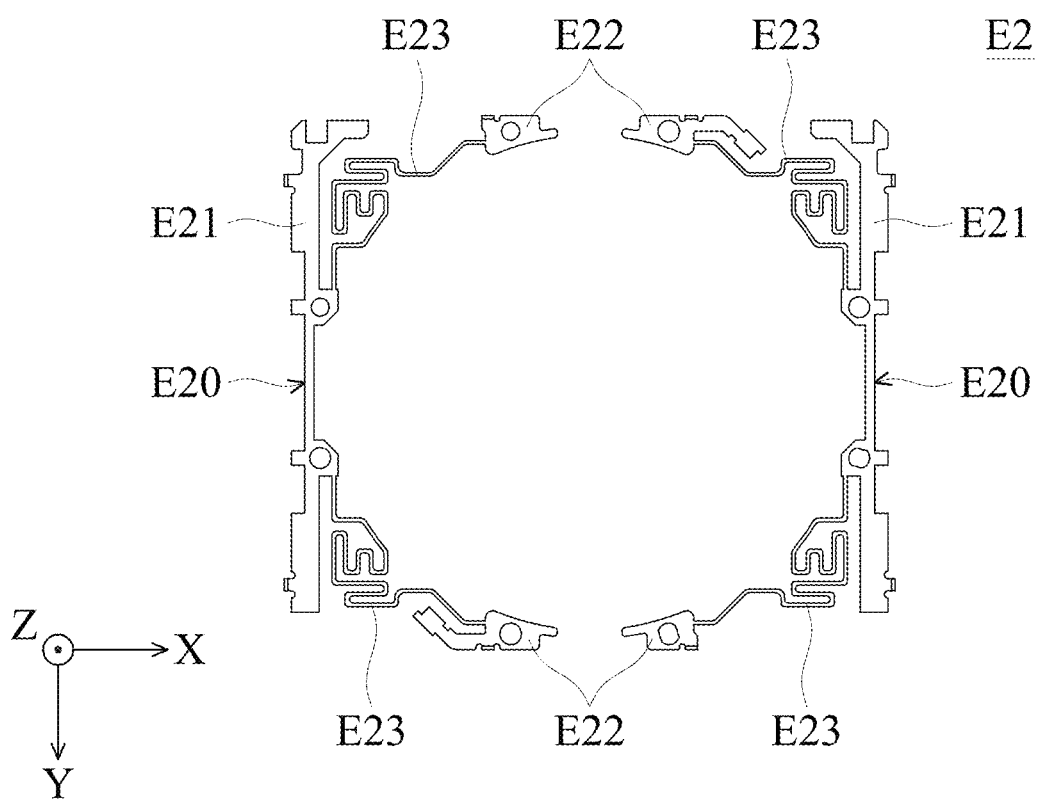
FIG. 9A is a schematic diagram of a second elastic member according to another embodiment of the invention.

In some embodiments, the appearance and the structure of the second elastic member E2 are similar to that of the first elastic member E1. As shown in FIG. 9A, in another embodiment, the second elastic member E2 comprises a plurality of second elastic parts E20, and each of the second elastic parts E20 comprises one second fixed portion E21, two second moving portion E22, and a plurality of second string portion E23 connected to the second fixed portion E21 and the second moving portion E23. Two second moving portion E22 are respectively disposed on opposite ends of the second elastic part E20, and the second fixed portion E21 is disposed between two second moving portions E22.

Figure 9B:
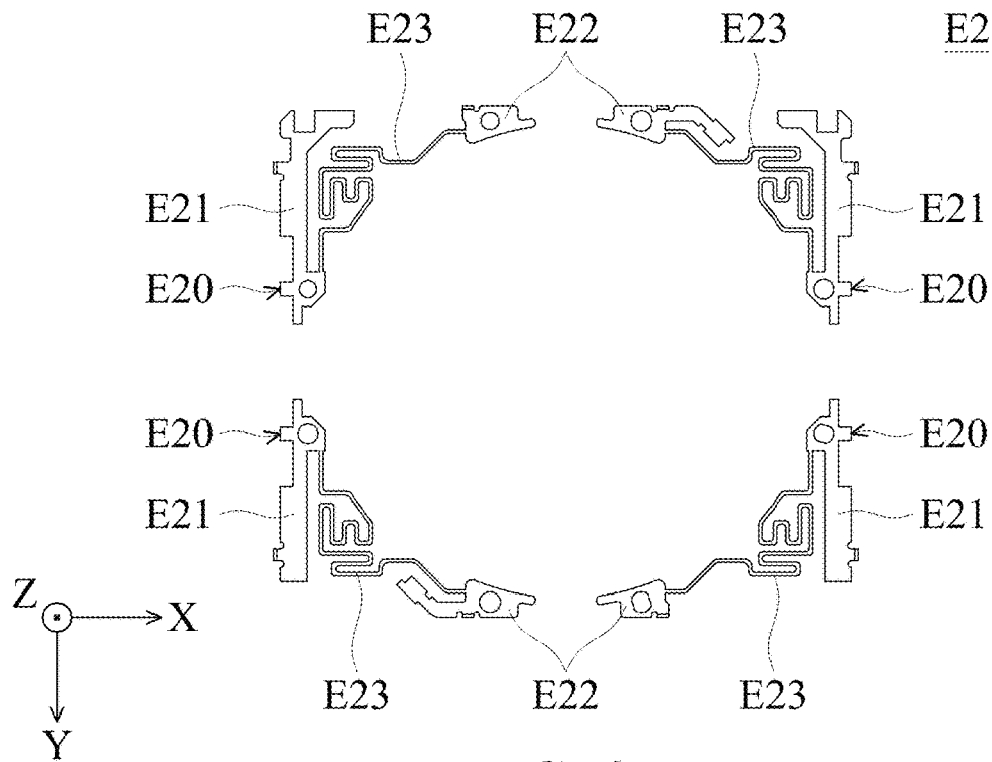
FIG. 9B is a schematic diagram of a second elastic member according to another embodiment of the invention.

As shown in FIG. 9B, in another embodiment, the second elastic member E2 comprises a plurality of second elastic parts E20, and each of the second elastic parts E20 comprises one second fixed portion E21, one second moving portion E22, and a plurality of second string portions E23 connected to the second fixed portion E21 and the second moving portion E22. The second fixed portion E21 and the second moving portion E22 are respectively disposed on opposite ends of the second elastic part E20.

Figure 9C:
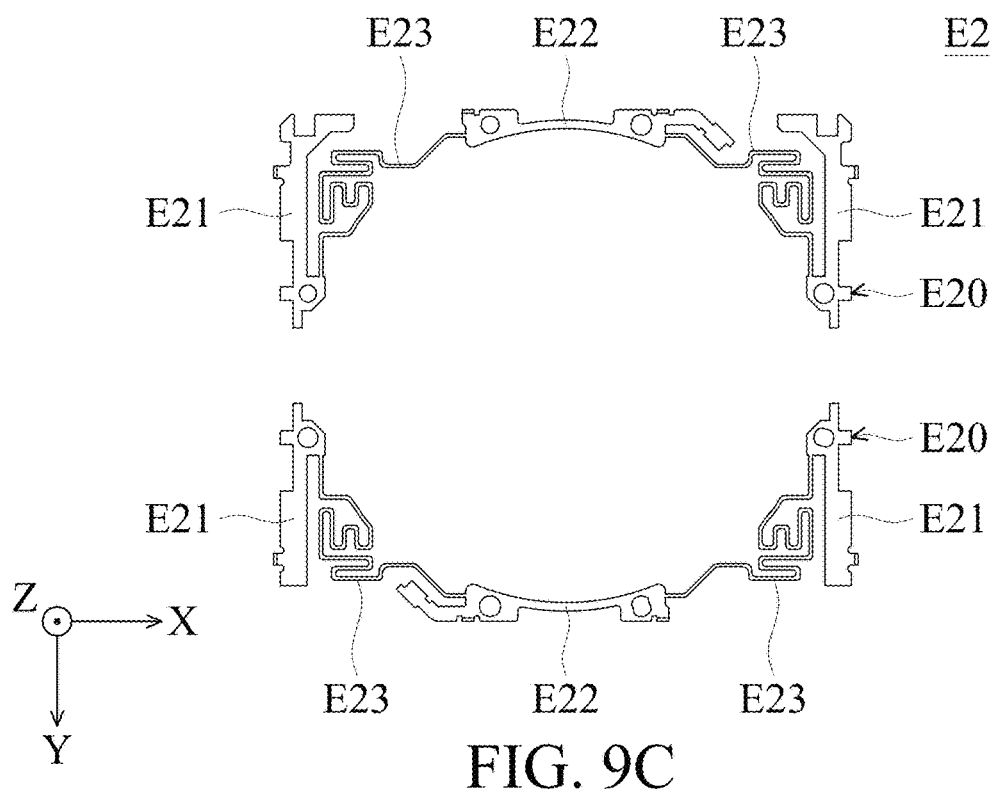
FIG. 9C is a schematic diagram of a second elastic member according to another embodiment of the invention.

As shown in FIG. 9C, in another embodiment, the second elastic member E2 comprises a plurality of second elastic parts E20, and each of the second elastic parts E20 comprises two second fixed portions E21, one second moving portion E22, and a plurality of second string portions E23 connected to the second fixed portions E21 and the second moving portion E22. Two second fixed portions E21 are respectively disposed on opposite ends of the second elastic part E20, and the second moving portion E22 is disposed between two second fixed portions E21.

When the second elastic member E2 in FIG. 9A, FIG. 9B or FIG. 9C is used in the lens driving module 10, the second fixed portion E21 and the second moving portion E22 are respectively adjacent to the first side 11 and the second side 12 of the lens driving module 10, and the second fixed portion E21 is disposed between the second electromagnetic driving assembly 400 and the top plate 110 of the upper housing 100. Therefore, contact between the second elastic member E2 and the second electromagnetic driving assembly 400 when the lens holder 200 moves toward the base 500 along the Z-axis can be prevented, and the movement of the lens holder 200 is not disturbed.

In summary, a lens driving module is provided. Since the first fixed portion of the first elastic affixed member affixed to the base is disposed between the second electromagnetic driving assembly and the base, and the second fixed portion of the second elastic member affixed to the top plate is disposed between the second electromagnetic driving assembly and the top plate, the volume of the lens driving module can be reduced, and the lens driving module can be disposed in the miniaturized electronic device. Moreover, since the first fixed portion and the first moving portion (or the second fixed portion and the second moving portion) are respectively disposed on the different sides of the lens driving module, contact between the first elastic member and the second electromagnetic driving assembly and contact between the second elastic member and the second electromagnetic driving assembly can be prevented.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism, comprising:
an upper housing;
a lens holder, configured to accommodate an optical member having an optical axis, wherein the lens holder is movable relative to the upper housing;
a driving assembly, configured to drive the lens holder to move relative to the upper housing;
an elastic assembly, elastically connected to the lens holder and the upper housing; and
a base with an opening, wherein the base is disposed below the lens holder, and the upper housing is joined to the base,
wherein the elastic assembly overlaps the driving assembly as seen from the optical axis, and
wherein the driving assembly comprises a driving coil, and a top plate of the upper housing is disposed between the lens holder and the driving coil when viewed from a direction which is perpendicular to the optical axis.

2. The optical member driving mechanism as claimed in claim 1, wherein when viewed from the direction which is perpendicular to the optical axis, the upper housing covers the elastic assembly.

3. The optical member driving mechanism as claimed in claim 1, wherein the upper housing is exposed from the optical member driving mechanism when viewed from the optical axis and the direction which is perpendicular to the optical axis.

* * * * *